United States Patent
Horikoshi et al.

(10) Patent No.: US 10,298,141 B2
(45) Date of Patent: May 21, 2019

(54) MOTOR DRIVE DEVICE

(71) Applicant: FANUC CORPORATION, Yamanashi (JP)

(72) Inventors: Shinichi Horikoshi, Yamanashi (JP); Yuuya Nakagawa, Yamanashi (JP)

(73) Assignee: FANUC CORPORATION, Yamanashi (JP)

( * ) Notice: Subject to any disclaimer, the term of this patent is extended or adjusted under 35 U.S.C. 154(b) by 0 days.

(21) Appl. No.: 15/896,317

(22) Filed: Feb. 14, 2018

(65) Prior Publication Data

US 2018/0241316 A1  Aug. 23, 2018

(30) Foreign Application Priority Data

Feb. 23, 2017 (JP) ................. 2017-032098

(51) Int. Cl.
*H02M 3/24* (2006.01)
*H02M 5/458* (2006.01)
*H02M 1/42* (2007.01)
*H02P 27/08* (2006.01)
*H02M 1/00* (2006.01)

(52) U.S. Cl.
CPC ....... *H02M 5/4585* (2013.01); *H02M 1/4233* (2013.01); *H02P 27/08* (2013.01); *H02P 27/085* (2013.01); *H02M 2001/007* (2013.01); *H02P 2201/03* (2013.01); *H02P 2201/07* (2013.01); *Y02B 70/126* (2013.01)

(58) Field of Classification Search
CPC .. H02M 7/4807; H02M 5/225; H02M 7/4826; H02M 7/219; H02M 2001/009; H02J 7/345; H02J 9/061; Y02B 70/1441
USPC ... 363/16–17, 34, 37, 97, 98, 126, 131, 132, 363/127; 307/64, 66; 318/376, 800, 801
See application file for complete search history.

(56) References Cited

U.S. PATENT DOCUMENTS

| | | | |
|---|---|---|---|
| 7,098,557 B2* | 8/2006 | Swanson ................. | H02J 7/345 307/46 |
| 2006/0066283 A1* | 3/2006 | Ota ..................... | H02M 5/4585 318/803 |
| 2008/0123225 A1* | 5/2008 | Matsubara .............. | H02M 1/32 361/15 |

(Continued)

FOREIGN PATENT DOCUMENTS

| JP | 2009-207305 A | 9/2009 |
|---|---|---|
| JP | 2009-232537 A | 10/2009 |

(Continued)

OTHER PUBLICATIONS

An Office Action mailed by the Japanese Patent Office dated Jul. 10, 2018, which corresponds to Japanese Patent Application No. 2017-032098 and is related to U.S. Appl. No. 15/896,317.

*Primary Examiner* — Rajnikant B Patel
(74) *Attorney, Agent, or Firm* — Studebaker & Brackett PC

(57) ABSTRACT

A motor drive device that inputs AC power from a power supply to drive a motor includes: a converter that converts the AC power from the power supply into DC power; a DC/DC converter that generates DC power produced by stepping-up, stepping-down, or stepping-up and stepping-down the DC power from the converter; an inverter that converts the DC power from the DC/DC converter into AC power and supplies to the motor; and an electrical storage capacitor that is provided between the DC/DC converter and the inverter.

15 Claims, 7 Drawing Sheets

(56) References Cited

U.S. PATENT DOCUMENTS

| | | | | |
|---|---|---|---|---|
| 2012/0014151 A1* | 1/2012 | Alexander | ............ | H02M 5/225 363/123 |
| 2014/0254223 A1* | 9/2014 | Limpaecher | ........ | H02M 7/4826 363/126 |
| 2015/0021998 A1* | 1/2015 | Trescases | ................ | H02J 3/385 307/46 |
| 2015/0229160 A1* | 8/2015 | Kawakami | ............ | H02M 3/156 307/64 |

FOREIGN PATENT DOCUMENTS

| | | |
|---|---|---|
| JP | 2013-009524 A | 1/2013 |
| JP | 2016-144374 A | 8/2016 |
| JP | 2016-220454 A | 12/2016 |

\* cited by examiner

MOTOR DRIVE DEVICE

This application is based on and claims the benefit of priority from Japanese Patent Application No. 2017-032098, filed on 23 Feb. 2017, the content of which is incorporated herein by reference.

BACKGROUND OF THE INVENTION

Field of the Invention

The present invention relates to a motor drive device which decreases the peak of input power from a power supply during motor acceleration, using an electrical storage capacitor.

Related Art

Motor drive devices for driving the motors used in machine tools, industrial machines, robots or the like have been known. With such motor drive devices, when the motor load varies and the motor accelerates, since it is necessary to supply abundant electric power transiently to the motor, the peak in input power from the power supply increases. When the peak in electric power supplied from the power supply to the motor drive device increases in this way, the power supply voltage fluctuates, and as a result thereof, a malfunction may arise in other equipment connected to the power supply.

Therefore, for motor drive devices, it has been known that the input power from the power supply is suppressed by employing the energy stored in an electrical storage capacitor during motor acceleration, thereby decreasing the peak in input power from the power supply. As such a motor drive device, there is a system that uses a DC/DC converter connected in parallel with an inverter (hereinafter referred to as "parallel connection DC/DC converter system") (e.g., Patent Documents 1 and 2), and a system that uses a PWM converter (hereinafter referred to as "PWM converter system") (e.g., Patent Document 3).

FIG. 7 is a schematic drawing showing the circuit configuration of a motor drive device of the parallel connection DC/DC converter system described in Patent Documents 1 and 2. This motor drive device 1X includes a converter 10X that converts the three-phase AC power from the power supply 2 into DC power, and an inverter 20X that converts the DC power from the converter 10X into three-phase AC power, and then supplies the three-phase AC power to the motor 3. With this motor drive device 1X, the electrical storage capacitor 30 is provided in parallel to the inverter 20X via a DC/DC converter 40X.

The DC/DC converter 40X charges a part of the electric power supplied from the converter 10X to the inverter 20X in the electrical storage capacitor 30, and supplies the energy stored in the electrical storage capacitor 30 to the inverter 20X only when the input/output current of the converter 10X (i.e. input power from the power supply) exceeds a predetermined value during motor acceleration. It is thereby possible to suppress the input power from the power supply 2 when the input/output electric current of the converter 10X exceeds the predetermined value, and thus reduce the peak in the input power from the power supply 2. In addition, since the energy stored in the electrical storage capacitor 30 is only supplied to the inverter 20X when the input/output electric current of the converter 10X exceeds the predetermined value, it is possible to effectively put to use the energy stored in the electrical storage capacitor 30, and thus the capacity of the electrical storage capacitor 30 can be decreased.

FIG. 8 is a schematic drawing showing the circuit configuration of the PWM converter-type motor drive device described in Patent Document 3. This motor drive device 1Y includes a converter 10Y that converters the three-phase AC power from the power supply 2 into DC power, and an inverter 20Y that converts the DC power from the converter 10Y into three-phase AC power, and then supplies the three-phase AC power to a motor 3. The electrical storage capacitor 30 is provided to a DC link part between the converter 10Y and inverter 20Y.

Herein, in order to further decrease the peak in input power from the power supply 2, it is preferable to increase the electric power supplied from the electrical storage capacitor 30. The energy E that can be supplied by the electrical storage capacitor 30 is expressed by Formula (1) below, when defining the capacity value of the electrical storage capacitor 30 as C, and defining the voltage value prior to discharge and the voltage value after discharge of the electrical storage capacitor 30 (i.e. upper limit value and lower limit value for the output voltage of the converter 10Y) as V1 and V2.

$$E = \frac{1}{2} \times C \times (V1^2 - V2^2) \quad (1)$$

In order to increase the electric power that can be supplied by the electrical storage capacitor 30, it is thereby necessary to either increase the capacity value C of the electrical storage capacitor 30, or increase the potential difference (V1−V2) between the upper limit value and lower limit value for the output voltage of the converter 10Y.

In FIG. 8, in order to increase the potential difference (V1−V2) in output voltages of the converter 10Y, a PWM-type step-up converter that performs a step-up operation in cooperation with a reactor 11 is used as the converter 10Y. This converter 10Y increases the potential difference (V1−V2) for the output voltage, by raising the upper limit value V1 for the output voltage by the step-up operation, and then increases the electric power supplied from the electrical storage capacitor 30. It is thereby possible to further suppress input power from the power supply 2, and further reduce the peak in input power from the power supply 2.

Patent Document 1: Japanese Unexamined Patent Application, Publication No. 2009-207305
Patent Document 2: Japanese Unexamined Patent Application, Publication No. 2009-232537
Patent Document 3: Japanese Unexamined Patent Application, Publication No. 2016-144374

SUMMARY OF THE INVENTION

With the parallel connection DC/DC converter-type motor drive device shown in FIG. 7, the electric power supplied from the electrical storage capacitor 30 is supplied via the DC/DC converter 40X; therefore, it will be limited by the performance of the power semiconductor devices in the DC/DC converter 40X. For this reason, there is a possibility of the transient response characteristic being limited.

With the PWM converter-type motor drive device shown in FIG. 8, in order to further increase the electric power supplied from the electrical storage capacitor 30, i.e. in order to further increase the potential difference (V1−V2) for the output voltage of the converter 10Y, it has been considered to lower the lower limit value for the voltage of the electrical storage capacitor 30. However, the lower limit value for the voltage of the electrical storage capacitor 30 depends on the input voltage of the converter 10Y (i.e. power supply voltage); therefore, it has been difficult to lower the lower limit value for the voltage of the electrical storage capacitor 30.

In more detail, suppression of the input current (i.e. input power from the power supply 2) by the PWM switching operation of the PWM converter is possible in a case in which the DC link voltage (i.e. voltage at the electrical storage capacitor 30) is higher than the input voltage peak value. In the case of the DC link voltage equaling the input voltage peak value, for the electric power demanded during motor acceleration, since the electric current flows to the diode part of the power semiconductor device in the PWM converter, limitation of the input power is not possible by the PWM switching operation. In other words, it is the same as a diode rectifier-based converter.

Therefore, the present invention has an object of providing a motor drive device that can increase the supplied electric power from the electrical storage capacitor during motor acceleration, without depending on the power supply voltage. In addition, the present invention has an object of providing a motor drive device that prevents the supplied electric power from the electrical storage capacitor from being limited during motor acceleration.

(1) A motor drive device (e.g., the motor drive device 1 described later) according to the present invention is a motor drive device that inputs AC power from a power supply (e.g., the power supply 2 described later) to drive a motor (e.g., the motor 3 described later) includes: a converter (e.g., the converter 10 described later) that converts the AC power from the power supply into DC power; a DC/DC converter (e.g., the DC/DC converter 40 described later) that generates DC power produced by stepping-up, stepping-down, or stepping-up and stepping-down the DC power from the converter; an inverter (e.g., the inverter 20 described later) that converts the DC power from the DC/DC converter into AC power and supplies to the motor; and an electrical storage capacitor (e.g., the electrical storage capacitor 30 described later) that is provided between the DC/DC converter and the inverter.

(2) In the motor drive device described in (1), the DC/DC converter may restrict an output current to no more than a predetermined maximum output current value, and may restrict a regeneration current to a predetermined maximum regeneration current value.

(3) In the motor drive device described in (1) or (2), the DC/DC converter may be a step-up/down DC/DC converter, a lower limit value for the output voltage of the DC/DC converter may be set based on a minimum voltage value capable of driving the motor; and an upper limit value for the output voltage of the DC/DC converter may be set based on a breakdown voltage of the inverter or a breakdown voltage of the motor.

(4) In the motor drive device described in (1) or (2), the DC/DC converter may be a step-down DC/DC converter, and a lower limit value for the output voltage of the DC/DC converter may be set based on a minimum voltage value capable of driving the motor.

(5) In the motor drive device described in (1) or (2), the DC/DC converter may be a step-up DC/DC converter, and an upper limit value for the output voltage of the DC/DC converter may be set based on a breakdown voltage of the inverter or a breakdown voltage of the motor.

(6) In the motor drive device described in (3), a capacity value C of the electrical storage capacitor may be set based on Formula (1), which is based on a maximum energy E to be supplied by the electrical storage capacitor, and an upper limit value V1 and lower limit value V2 for the output voltage of the DC/DC converter:

$$E = \tfrac{1}{2} \times C \times (V1^2 - V2^2) \qquad (1).$$

(7) In the motor drive device described in any one of (1) to (6), the DC/DC converter may be installed within the same housing as the converter and/or the inverter.

(8) In the motor drive device described in (2), the DC/DC converter may restrict the output current to no more than a predetermined maximum output current value, upon perform pre-charging of the electrical storage capacitor.

According to the present invention, it is possible to provide a motor drive device that, during motor acceleration, can increase the supply power from an electrical storage capacitor without depending on the power supply voltage. In addition, the present invention can provide a motor drive device that prevents the supply power from an electrical storage capacitor from being restricted, during motor acceleration.

DETAILED DESCRIPTION OF THE INVENTION

Hereinafter, an example of an embodiment of the present invention will be explained by referencing the attached drawings. It should be noted that the same reference symbols shall be attached to identical or corresponding portions in the respective drawings.

Figure 1:
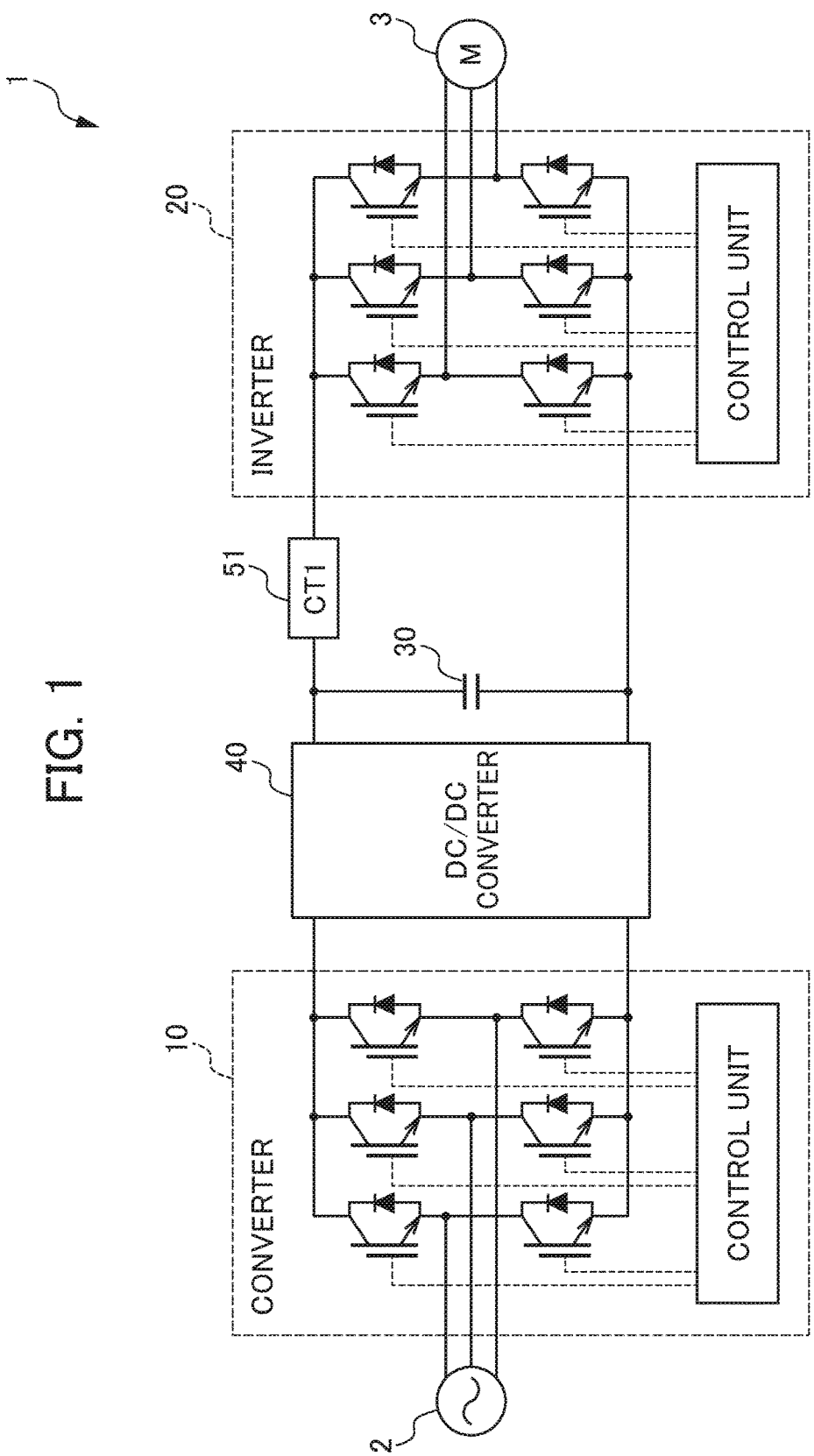
FIG. 1 is a view showing the circuit configuration of a motor drive device according to an embodiment of the present invention.

FIG. 1 is a view showing the circuit configuration of a motor drive device according to an embodiment of the present invention. The motor drive device 1 shown in FIG. 1 inputs three-phase AC power from a general-purpose three-phase AC power supply 2, and drives a motor 3. It should be noted that the power supply 2 is not limited to three-phase alternating current, and may be single-phase alternating current, for example.

The motor drive device 1 includes a converter 10, inverter 20, electrical storage capacitor 30, DC/DC converter 40, and first current sensor 51.

The converter 10 is an AC/DC converter that converts AC power from the power supply 2 into DC power during powering of the motor 3. The converter 10 is constituted by bridge circuits using IGBT (Insulated Gate Bipolar Transistor), for example. The IGBT has a power semiconductor device and a diode connected in reverse parallel to the power semiconductor device. The converter 10 thereby constitutes a diode rectifier-based converter consisting of bridge circuits of 6 diodes, and constitutes a PWM converter consisting of bridge circuits of 6 power semiconductor devices.

The converter 10 full-wave rectifies and converts the AC power into DC power, by way of the diode rectifier-based converter, during powering of the motor 3. On the other hand, during regeneration of the motor 3, the converter 10 causes the regeneration electric power to be regenerated on the side of the power supply 2, by PWM controlling the PWM converter with a control unit.

It should be noted that the converter 10 may convert the AC power into DC power by PWM controlling the PWM converter with the control unit during powering of the motor 3. It is thereby possible to improve the power factor.

The DC/DC converter 40 generates DC power which is the product of stepping-up and stepping-down the DC power from the converter 10, during powering of the motor 3. In addition, the DC/DC converter 40 supplies the regeneration power from the inverter 20 to the converter 10 during regeneration of the motor 3. The details of the DC/DC converter 40 will be described later.

The inverter 20 converts the DC power from the DC/DC converter 40 into AC power, and supplies this AC power to the motor 3, during powering of the motor 3. The inverter 20 is constituted by bridge circuits using IGBT, for example. The inverter 20 is thereby constituted by bridge circuits consisting of power semiconductor devices and diodes connected in reverse parallel to the power semiconductor devices. The inverter 20 converts the DC voltage into AC voltage of the desired waveform and frequency, way of on-off controlling (e.g., PWM control) these power semiconductor devices according to commands from the control unit.

In addition, the inverter 20 converts the AC power regenerated from the motor 3 during regeneration of the motor 3 into DC power, and supplies this DC power to the DC link part between the inverter 20 and the DC/DC converter 40.

The electrical storage capacitor 30 is provided to the DC link part between the DC/DC converter 40 and the inverter 20. The electrical storage capacitor 30 stores the DC power from the DC/DC converter 40, and the DC power from the inverter 20 (regeneration power). In addition, the electrical storage capacitor 30 smooths the DC voltage converted by the DC/DC converter 40 or inverter 20.

A first current sensor (CT1) 51 is provided between the electrical storage capacitor 30 and inverter 20. The first current sensor 51 measures the input current value of the inverter 20 during powering of the motor 3, and measures the regeneration current value of the inverter 20 during regeneration of the motor 3.

Figure 2:
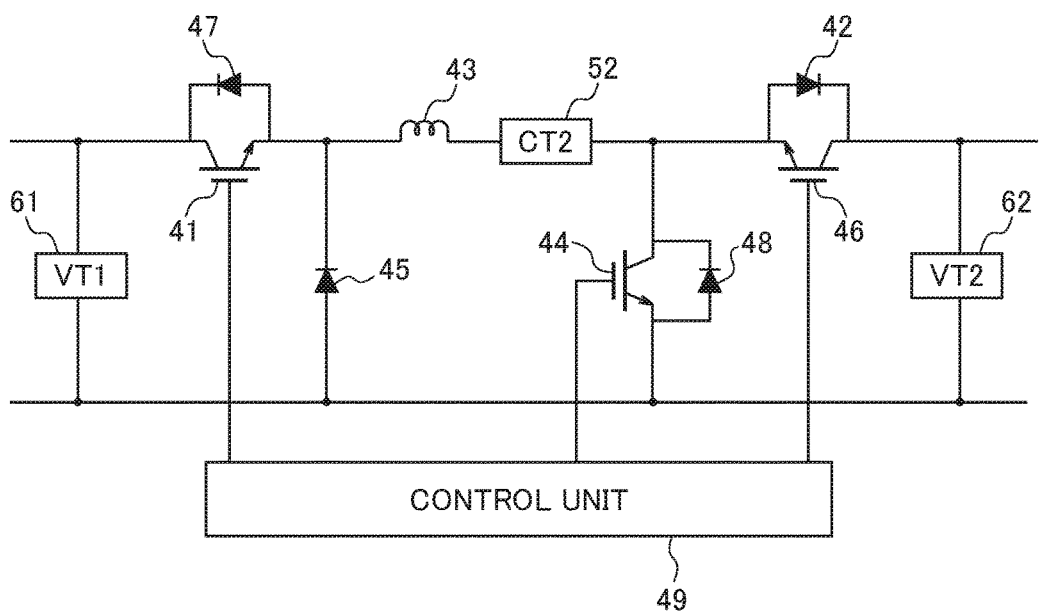
FIG. 2 is a view showing an example of the circuit configuration of a DC/DC converter in FIG. 1.

Next, the DC/DC converter 40 will be explained in detail. FIG. 2 is a view showing one example of the circuit configuration of the DC/DC converter 40.

The DC/DC converter 40 shown in FIG. 2 is mainly constituted by a well-known chopper-type step-up/down DC/DC converter configured by inductors, switching devices and diodes. More specifically, the DC/DC converter 40 includes a powering switching device 41, powering diode 42, reactor 43, step-up switching device 44, step-down diode 45, regeneration switching device 46, regeneration diode 47, diode 48, control unit 49, second current sensor (CT2) 52, first voltage sensor (VT1) 61, and second voltage sensor (VT2) 62. The powering switching device 41 and regeneration diode 47, regeneration switching device 46 and powering diode 42, and step-up switching device 44 and diode 48 are respectively configured by IGBT.

The second current sensor 52 measures the output current value of the DC/DC converter 40 during powering of the motor and measures the regeneration current value of the DC/DC converter 40 during regeneration of the motor 3. The first voltage sensor 61 measures the input voltage value of the DC/DC converter 40. The second voltage sensor 62 measures the output voltage value of the DC/DC converter 40.

The control unit 49 controls the step-up/down operation of the DC/DC converter 40, by controlling the powering switching device 41, step-up switching device 44 and regeneration switching device 46 based on the input voltage value detected by the first voltage sensor 61 and the output voltage value detected by the second voltage sensor 62. The target value for the output voltage (upper limit value for step-up) of the DC/DC converter 40 is set based on the smaller breakdown voltage among either the breakdown voltage of the inverter 20 and the breakdown voltage of the motor 3 (e.g., on the order of 95% of the breakdown voltage of the inverter 20). In addition, the lower limit value for the output voltage (lower limit value for step-down) of the DC/DC converter 40 is set based on the minimum voltage value capable of driving the motor 3 (e.g., on the order of 105% of the minimum voltage value capable of driving the motor 3).

In addition, the control unit 49 regulates the output current of the DC/DC converter 40 to no more than a predetermined maximum output current value, by controlling the powering switching device 41, step-up switching device 44 and regeneration switching device 46, based on the input current value of the inverter 20 detected by the first current sensor 51 or the output current value of the DC/DC converter 40 detected by the second current sensor 52. In addition, the control unit 49 regulates the regeneration current of the DC/DC converter 40 to no more than a predetermined maximum regeneration current value, based on the detected input current value of the inverter 20 or the output current value of the DC/DC converter 40.

In the present embodiment, the DC/DC converter 40 may be mounted within the same housing as the converter 10 and/or inverter 20. It is thereby possible to shorten the wiring for connecting the DC/DC converter 40 and converter 10, and/or the wiring for connecting the DC/DC converter 40 and the inverter 20, and thus the transient response characteristic can be improved.

It should be noted that the DC/DC converter 40, converter 10 and inverter 20 may be mounted in separate housings. It is thereby possible to obtain variations in the respective designs of the DC/DC converter 40, converter 10 and inverter 20.

In addition, the capacity value C of the electrical storage capacitor 30 is set based on Formula (1) below, which is based on the maximum energy E to be supplied by the electrical storage capacitor 30, and upper limit value V1 and lower limit value V2 for the output voltage of the DC/DC converter 40.

$$E = \frac{1}{2} \times C \times (V1^2 - V2^2) \quad (1)$$

Herein, it is sufficient for the maximum energy E to be supplied by the electrical storage capacitor 30 to be calculated based on the driving conditions of the motor 3 (e.g., energy required in acceleration operation of the motor 3, and/or energy regenerated in deceleration operation of the motor 3). It is thereby possible to supply the power deficit from the electrical storage capacitor 30, even if restricting the output current of the DC/DC converter 40 until the output voltage of the DC/DC converter 40 declines from the upper limit value V1 to the lower limit value V2, during acceleration of the motor 3.

Figure 3:
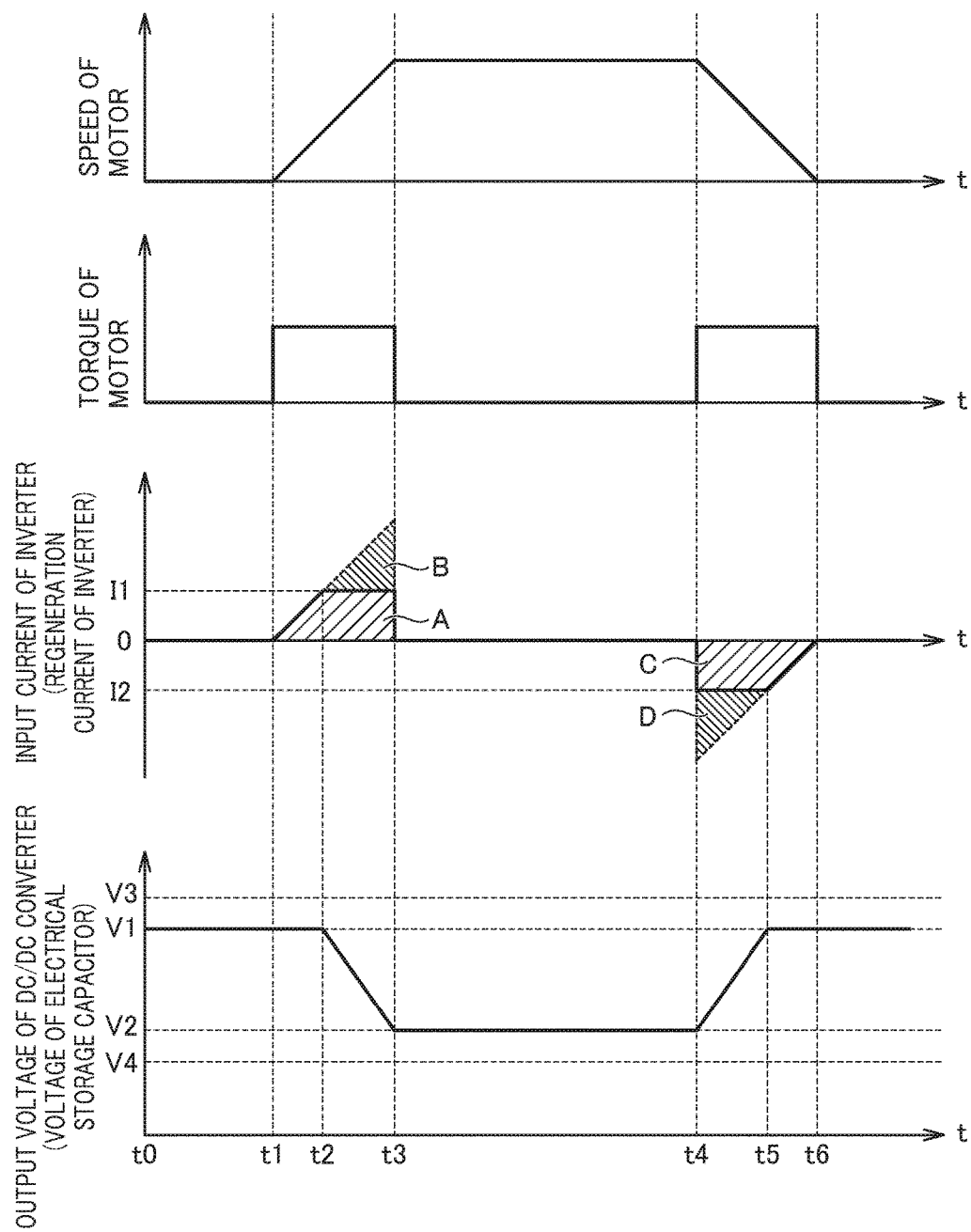
FIG. 3 provides timing charts of the electrical signals of each part in the motor drive device according to the embodiment of the present invention.
Figure 4:
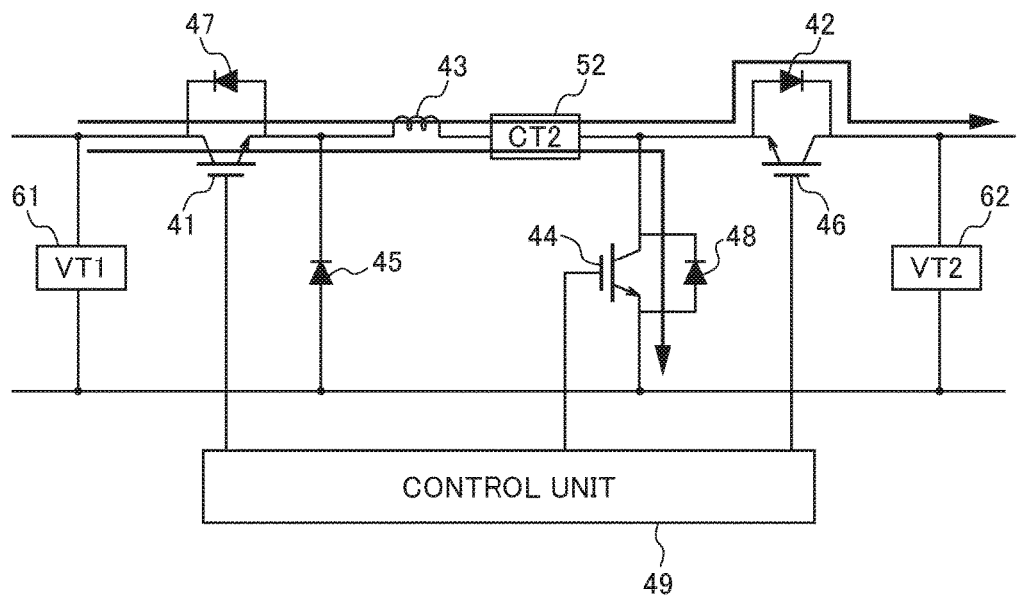
FIG. 4 is a view showing a step-up operation of the DC/DC converter during motor powering.
Figure 5:
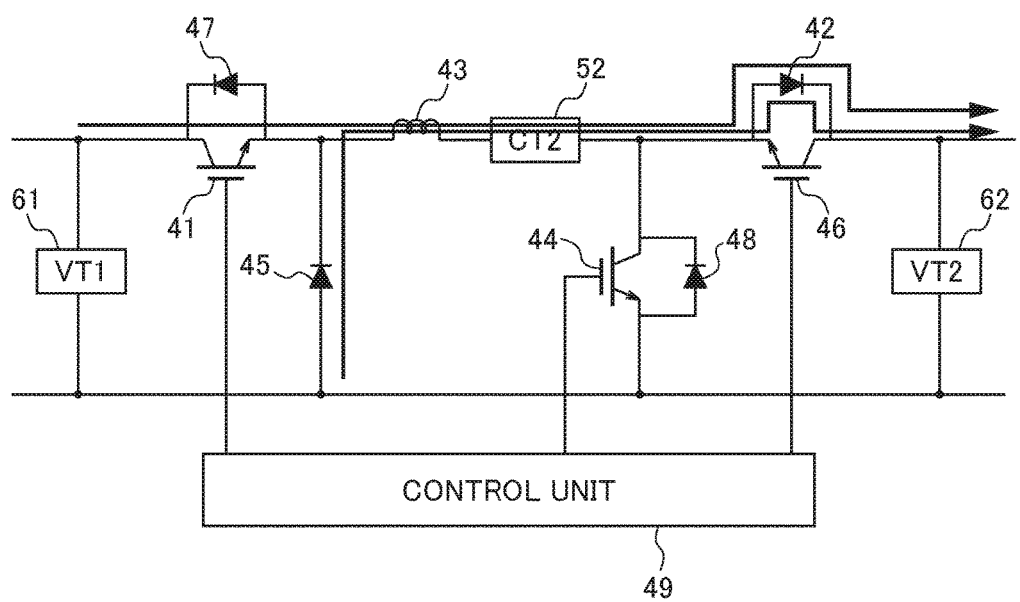
FIG. 5 is a view showing a step-down operation of a DC/DC converter during motor powering.
Figure 6:
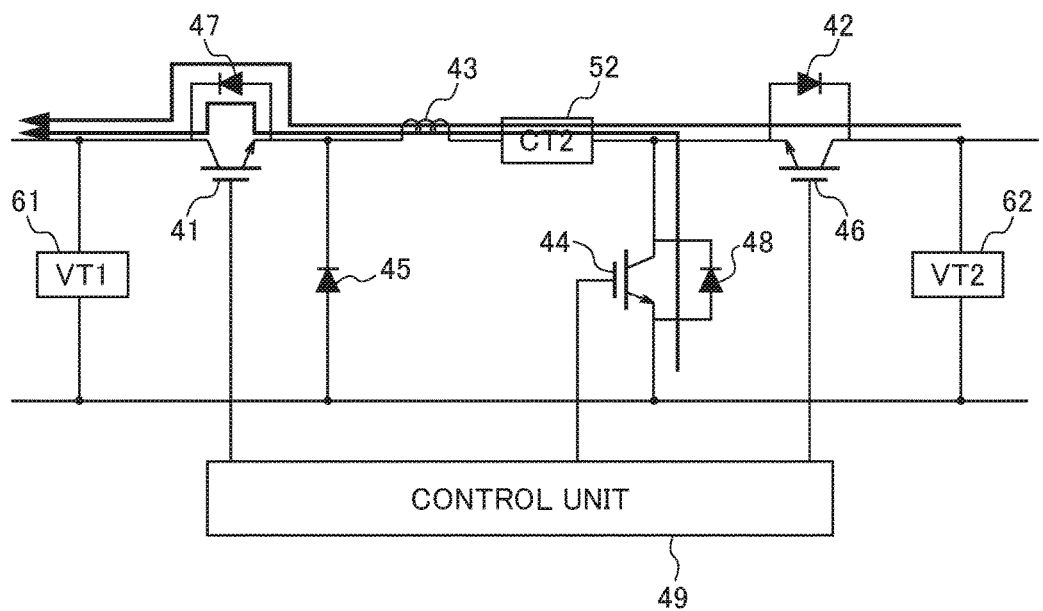
FIG. 6 is a view showing a regeneration operation of a DC/DC converter during motor regeneration.
Figure 7:
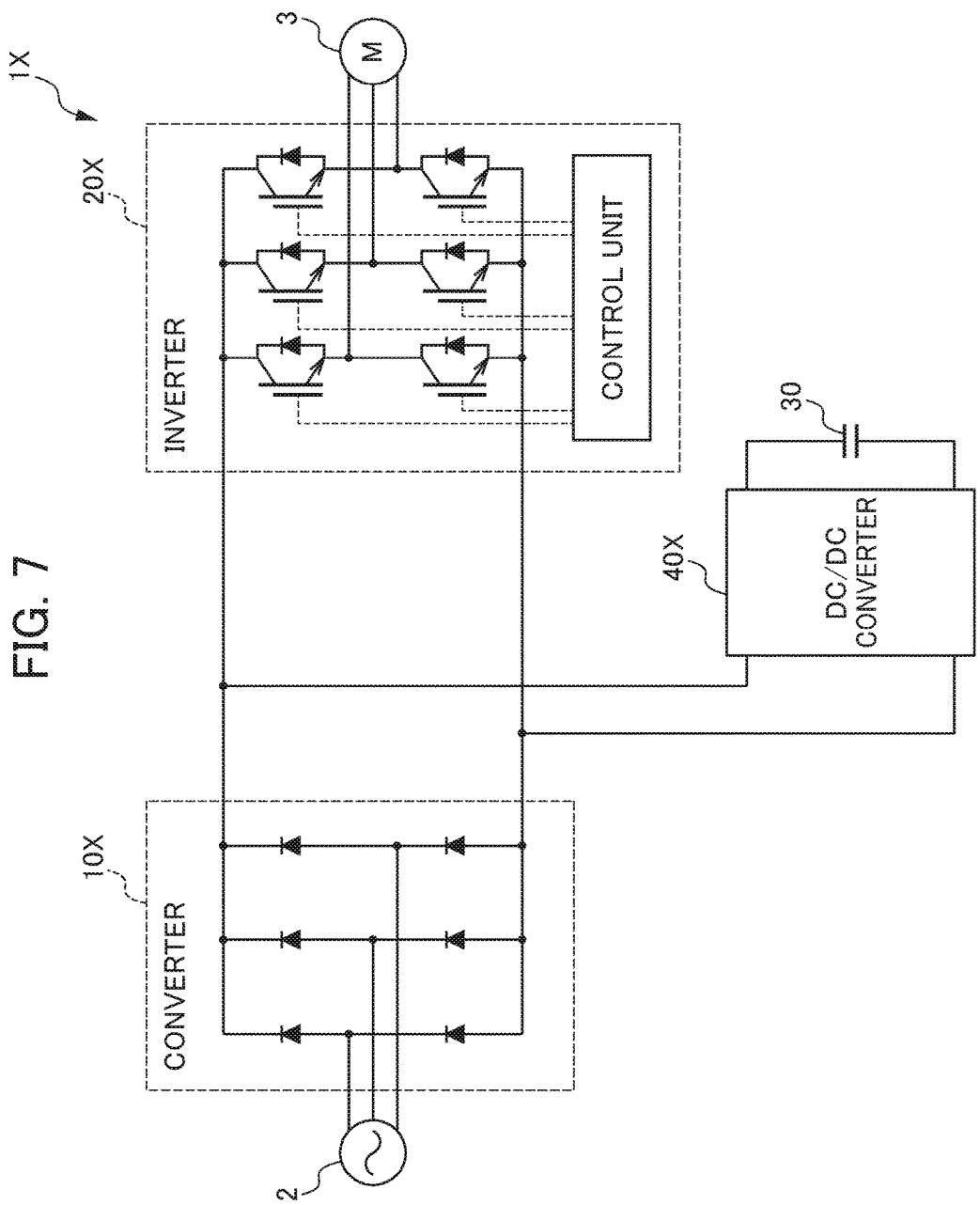
FIG. 7 is a schematic drawing showing the circuit configuration of a conventional parallel connection DC/DC converter-type motor drive device.
Figure 8:
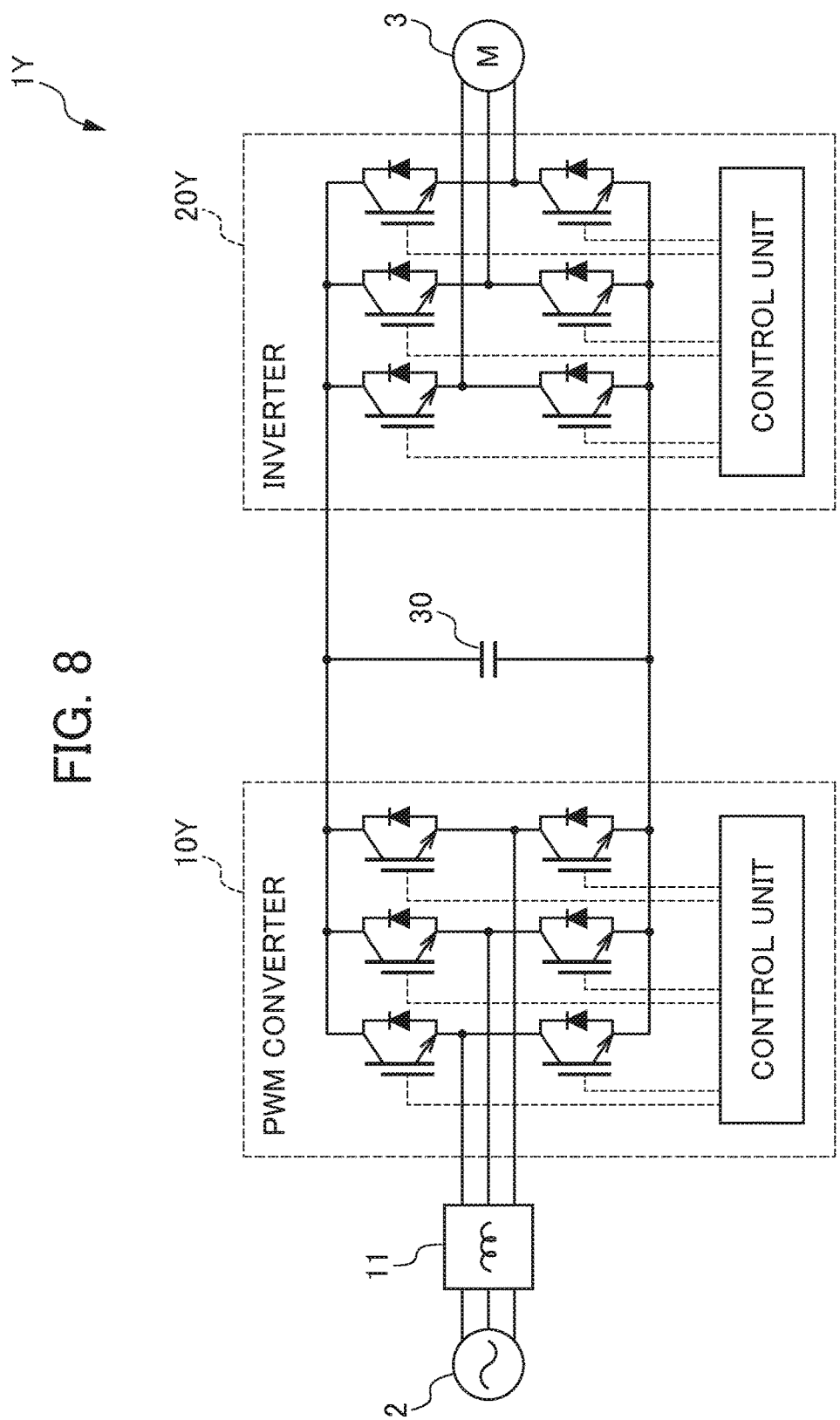
FIG. 8 is a schematic drawing showing the circuit configuration of a conventional PWM converter-type motor drive device.

Hereinafter, operation of the DC/DC converter 40 in the motor drive device 1 will be explained by referencing FIGS. 3 to 6. FIG. 3 provides timing charts for the electrical signals of the respective parts of the motor drive device 1. FIG. 4 is a view showing the step-up operation of the DC/DC converter 40 during powering of the motor 3. FIG. 5 is a view showing step-down operation of the DC/DC converter 40 during powering of the motor 3. FIG. 6 is a view showing regeneration operation of the DC/DC converter 40 during regeneration of the motor 3.

(During Stop or During Low-Speed Operation of Motor 3)

First, during stop or during low-speed operation of the motor 3 (time t0 to time t1 in FIG. 3), the control unit 49 of the DC/DC converter 40 controls stepping up of the output voltage of the DC/DC converter 40 to the target voltage V1, by controlling the powering switching device 41, step-up switching device 44 and regeneration switching device 46, based on the input voltage value detected by the first voltage sensor 61 and the output voltage value detected by the second voltage sensor 62. For example, the target value V1 for the output voltage of the DC/DC converter 40 is on the order of 95% of the breakdown voltage V3 of the smaller one among the breakdown voltage of the inverter 20 and the breakdown voltage of the motor 3.

More specifically, as shown in FIG. 4, the control unit 49 PWM switching controls the step-up switching device 44, with the powering switching device 41 set to the ON state and the regeneration switching device 46 set to the OFF state. When the step-up switching device 44 is in the ON state, energy is stored in the reactor 43, by the electric current flowing in order through the powering switching device 41, reactor 43 and step-up switching device 44. Then, when the step-up switching device 44 enters the OFF state, the voltage stepped up by the amount of energy stored in the reactor 43 is outputted, by the electric current flowing in order through the powering switching device 41, reactor 43 and powering diode 42.

(During Acceleration of Motor 3)

Next, during acceleration of the motor 3 (time t1 to time t2 in FIG. 3), the output current of the DC/DC converter 40 increases accompanying an increase in the input current of the inverter 20. Then, when the input current value of the inverter 20 reaches a predetermined maximum output current value I1 (time t2 in FIG. 3), based on the input current value of the inverter 20 detected by the first current sensor 51, the output current of the DC/DC converter 40 is restricted to the predetermined maximum output current value I1, by controlling the powering switching device 41, step-up switching device 44 and regeneration switching device 46. At this time, the control unit 49 causes the output voltage of the DC/DC converter 40 to gradually decline (time t2 to time t3 in FIG. 3).

Subsequently, the control unit 49 switches from step-up operation (FIG. 4) to step-down operation (FIG. 5) based on the input voltage value detected by the first voltage sensor 61 and the output voltage value detected by the second voltage sensor 62. In the step-down operation, the control unit 49 step-down controls so as to cause the output voltage of the DC/DC converter 40 to gradually decline to the lower limit value V2, by controlling the powering switching device 41, step-up switching device 44 and regeneration switching device 46, based on the detected input voltage value and output voltage value. For example, the lower limit value V2 for the output voltage of the DC/DC converter 40 is on the order of 105% of the minimum voltage value V4 capable of driving the motor 3.

More specifically, as shown in FIG. 5, the control unit 49 switching controls the powering switching device 41, with the regeneration switching device 46 and step-up switching device 44 set to the OFF state. When the powering switching device 41 is in the ON state, the energy is stored in the reactor 43, as well as the voltage stepped down by the amount of the energy stored in the reactor 43 being outputted, by way of the electric current flowing in order through the powering switching device 41, reactor 43 and powering diode 42. Then, when the powering switching device 41 enters the OFF state, the energy stored in the reactor 43 is outputted by the electric current flowing in order through the step-down diode 45, reactor 43 and powering diode 42.

In this way, even if the input current of the inverter 20 increases to exceed the maximum output current value I1, it is possible to reduce the peak of the input current from the power supply 2, i.e. peak of the input power from the power supply 2, by restricting the output current of the DC/DC converter 40 to no more than the maximum output current value I1.

At this time, the deficit power (B in FIG. 3) arrived at by deducting the output current (A in FIG. 3) of the DC/DC converter 40 from the input current of the inverter 20 is supplied from the electrical storage capacitor 30. Since the electrical storage capacitor 30 is directly connected to the inverter 20 without going through the DC/DC converter as in the aforementioned parallel connection DC/DC converter system, it is possible to prevent the supply power from the electrical storage capacitor 30 to the inverter 20 from being restricted to the performance of the power semiconductor device of the DC/DC converter.

In addition, since the DC/DC converter 40 is a chopper-type step-up/down DC/DC converter, it is possible to lower the lower limit value of the output voltage, without depending on the input voltage (i.e. power supply voltage of the power supply 2). It is thereby possible to assume a large potential difference (V1−V2) between the upper limit value V1 and lower limit value V2 for the output voltage of the DC/DC converter 40, i.e. potential difference of the electrical storage capacitor 30, without depending on the power supply voltage as in the aforementioned PWM converter system, and it is possible to increase the electrical power supplied from the electrical storage capacitor 30 to the inverter 20 (refer to Formula (1) above).

(During Constant Operation of Motor 3 (High-Speed))

Next, during constant speed operation of the motor 3 (time t3 to t4 in FIG. 3), the control unit 49 continues control to step down the output voltage of the DC/DC converter 40 to the lower limit value V2.

(During Deceleration of Motor 3 (During Regeneration))

Next, during deceleration of the motor 3 (time t4 to time t5 in FIG. 3), a large regeneration current is regenerated from the inverter 20, accompanying a large regeneration current being regenerated from the motor 3. At this time, the regeneration current of the DC/DC converter 40 is restricted to a predetermined maximum regeneration current value I2, by controlling the powering switching device 41, step-up switching device 44 and regeneration switching device 46, based on the regeneration current value of the inverter 20 detected by the first current sensor 51.

More specifically, as shown in FIG. 6, the control unit 49 switching controls the regeneration switching device 46, with the powering switching device 41 and step-up switching device 44 set to the OFF state. When the regeneration switching device 46 is in the ON state, the energy is stored in the reactor 43, along with the voltage that was stepped down by the amount of energy stored in the reactor 43 being regenerated, by way of the electric current flowing in order through the regeneration switching device 46, reactor 43 and regeneration diode 47. Then, when the regeneration switching device 46 enters the OFF state, the energy stored in the reactor 43 is regenerated by the electric current flowing in order through the diode 48, reactor 43 and regeneration diode 47.

At this time, the surplus amount not regenerated to the power supply 2 via the DC/DC converter 40 is stored in the electrical storage capacitor 30. The voltage of the electrical storage capacitor 30 (i.e. output voltage of DC/DC converter 40) thereby rises.

Subsequently, when the regeneration current value of the inverter 20 declines to the maximum regeneration current value I2 (time t5 in FIG. 3), the restriction of regeneration current of the DC/DC converter 40 is ended by controlling the powering switching device 41, step-up switching device 44 and regeneration switching device 46.

Subsequently (time t5 to time t6 in FIG. 3), the regeneration current of the inverter 20 is regenerated to the power supply 2, and the voltage of the electrical storage capacitor 30 (i.e. output voltage of DC/DC converter 40) is maintained at the upper limit value V1.

In this way, even if the regeneration current from the inverter 20 increases to exceed the maximum regeneration current value I2, it is possible to reduce the peak in electric current regenerated to the power supply 2, i.e. peak in power regenerated to the power supply 2, by restricting the regeneration current of the DC/DC converter 40 to no more than the maximum regeneration current value I2. At this time, the surplus amount (D in FIG. 3) arrived at by deducting the regeneration current (C in FIG. 3) of the DC/DC converter 40 from the regeneration current of the inverter 20 is stored in the electrical storage capacitor 30.

In addition, since it is possible to assume a large potential difference (V1–V2) between the upper limit value V1 and lower limit value V2 for the output voltage of the DC/DC converter 40, i.e. potential difference of the electrical storage capacitor 30, without depending on the power supply voltage as mentioned above, the power regenerated from the inverter 20 and stored in the electrical storage capacitor 30 can be increased (refer to Formula (1) above).

As explained above, with the motor drive device 1 of the present embodiment, the converter 10, DC/DC converter 40, electrical storage capacitor 30 and inverter 20 are connected in order in series. Since the DC/DC converter 40 is a chopper-type step-up/down DC/DC converter, it is possible to lower the lower limit value of the output voltage, without depending on the input voltage (i.e. power supply voltage of the power supply 2). During acceleration of the motor 3, it is thereby possible to assume a large potential difference (V1–V2) between the upper limit value V1 and lower limit value V2 for the output voltage of the DC/DC converter 40, i.e. potential difference of the electrical storage capacitor 30, without depending on the power supply voltage as in the aforementioned PWM converter system. For this reason, it is possible to increase the electric power supplied from the electrical storage capacitor 30 to the inverter 20. In addition, during deceleration of the motor 3, the power regenerated from the inverter 20 and stored in the electrical storage capacitor 30 can be increased.

In addition, with the motor drive device 1 of the present embodiment, the electrical storage capacitor 30 is directly connected to the inverter 20 without going through the DC/DC converter as in the aforementioned parallel connection DC/DC converter system. For this reason, during acceleration of the motor 3, it is possible to prevent the supply power from the electrical storage capacitor 30 to the inverter 20 from being restricted to the performance of the power semiconductor device of the DC/DC converter.

In addition, according to the motor drive device 1 of the present embodiment, since it is possible to assume a large potential difference for the electrical storage capacitor 30, the capacity of the electrical storage capacitor 30 can be decreased.

In addition, with the motor drive device 1 of the present embodiment, the output current of the DC/DC converter 40 is restricted to no more than the predetermined maximum output current value I1 by the DC/DC converter 40. During acceleration of the motor 3, it is thereby possible to reduce the peak of the input current from the power supply 2, i.e. peak of the input power from the power supply 2, even if the input current of the inverter 20 increases to exceed the maximum output current value I1 of the DC/DC converter 40. At this time, the deficit amount in input current of the inverter 20 is supplied from the electrical storage capacitor 30.

In addition, with the motor drive device 1 of the present embodiment, the regeneration current of the DC/DC converter 40 is restricted to no more than the predetermined maximum regeneration current value I2, by the DC/DC converter 40. During deceleration of the motor 3, it is thereby possible to reduce the peak in electric current regenerated to the power supply 2, i.e. peak in power regenerated to the power supply 2, even if the regeneration current from the inverter 20 increases to exceed the maximum regeneration current value I2. At this time, the surplus amount of regeneration current of the inverter 20 is stored in the electrical storage capacitor 30.

Although an embodiment of the present invention has been explained above, the present invention is not to be limited to the aforementioned embodiment. In addition, the effects described in the present embodiment are merely to exemplify the most preferred effects produced from the present invention, and the effects according to the present invention are not to be limited to those described in the present embodiment.

For example, in the aforementioned embodiment, a well-known chopper-type step-up/down DC/DC converter configured by inductors, switching devices, diodes, etc. is exemplified as the DC/DC converter 40. However, the DC/DC converter 40 is not limited thereto, and may be a well-known chopper-type step-down DC/DC converter configured by inductors, switching devices, diodes, etc. In this case, the lower limit value for the output voltage of the DC/DC converter may be set based on the minimum voltage value capable of driving the motor 3. Even in this form, since it is possible to lower the lower limit value for the output voltage without depending on the input voltage (i.e. power supply voltage of power supply 2), it is possible to assume a large potential difference (V1–V2) between the upper limit value V1 and lower limit value V2 for the output voltage of the DC/DC converter 40, i.e. potential difference of the electrical storage capacitor 30, and it is possible to increase the electrical power supplied from the electrical storage capacitor 30 to the inverter 20, during acceleration of the motor 3. In addition, during deceleration of the motor 3, the power regenerated from the inverter 20 and stored in the electrical storage capacitor 30 can be increased.

Furthermore, the DC/DC converter 40 may be a well-known chopper-type step-up DC/DC converter configured by inductors, switching devices, diodes, etc. In this case, the upper limit value for the output voltage of the DC/DC converter maybe set based on the breakdown voltage of the inverter 20 or breakdown voltage of the motor 3. Even in this form, since it is possible to raise the upper limit value for the output voltage, it is possible to assume a large potential difference (V1–V2) between the upper limit value V1 and lower limit value V2 for the output voltage of the DC/DC converter 40, i.e. potential difference of the electrical storage capacitor 30, and it is possible to increase the electrical power supplied from the electrical storage capacitor 30 to the inverter 20, during acceleration of the motor 3. In addition, during deceleration of the motor 3, the power regenerated from the inverter 20 and stored in the electrical storage capacitor 30 can be increased.

However, motor drive devices using an electrical storage capacitor, generally, include a pre-charging circuit that restricts the charging current upon pre-charging of the electrical storage capacitor (charging from a state in which an electric charge is not accumulated). The pre-charging circuit is a circuit for preventing circuit elements from being damaged due to excessive inrush current during pre-charging, and restricts the charging current using a pre-charging resistor, for example.

Concerning this point, in the aforementioned embodiment, the control unit 49 of the DC/DC converter 40 may restrict the output current of the DC/DC converter 40 to no more than a predetermined maximum output current value, upon performing pre-charging of the electrical storage capacitor 30. Since it is thereby possible to perform pre-charging of the electrical storage capacitor 30 by restricting the electric current by way of the DC/DC converter 40, the pre-charging circuit can be eliminated.

EXPLANATION OF REFERENCE NUMERALS

1, 1X, 1Y motor drive device
2 power supply
3 motor
10, 10X, 10Y converter
20, 20X, 20Y inverter
30 electrical storage capacitor
40, 40X DC/DC converter
41 powering switching device
42 powering diode
43 reactor
44 step-up switching device
45 step-down diode
46 regeneration switching device
47 regeneration diode
48 diode
49 control unit
51 first current sensor
52 second current sensor
61 first voltage sensor
62 second voltage sensor

What is claimed is:

1. A motor drive device that inputs AC power from a power supply to drive a motor, the motor drive device comprising:
    a converter that converts the AC power from the power supply into DC power;
    a DC/DC converter that generates DC power produced by stepping-up, stepping-down, or stepping-up and stepping-down the DC power from the converter;
    an inverter that converts the DC power from the DC/DC converter into AC power and supplies to the motor; and
    an electrical storage capacitor that is provided between the DC/DC converter and the inverter,
    wherein the DC/DC converter restricts an output current to no more than a predetermined maximum output current value, or restricts a regeneration current to a predetermined maximum regeneration current value.

2. The motor drive device according to claim 1,
    wherein the DC/DC converter is a step-up/down DC/DC converter,
    wherein a lower limit value for the output voltage of the DC/DC converter is set based on a minimum voltage value capable of driving the motor; and
    wherein an upper limit value for the output voltage of the DC/DC converter is set based on a breakdown voltage of the inverter or a breakdown voltage of the motor.

3. The motor drive device according to claim 1,
    wherein the DC/DC converter is a step-down DC/DC converter, and
    wherein a lower limit value for the output voltage of the DC/DC converter is set based on a minimum voltage value capable of driving the motor.

4. The motor drive device according to claim 1,
    wherein the DC/DC converter is a step-up DC/DC converter, and
    wherein an upper limit value for the output voltage of the DC/DC converter is set based on a breakdown voltage of the inverter or a breakdown voltage of the motor.

5. The motor drive device according to claim 2, wherein a capacity value C of the electrical storage capacitor is set based on Formula (1), which is based on a maximum energy E to be supplied by the electrical storage capacitor, and an upper limit value V1 and lower limit value V2 for the output voltage of the DC/DC converter:

$$E = \tfrac{1}{2} \times C \times (V1^2 - V2^2) \qquad (1).$$

6. The motor drive device according to claim 1, wherein the DC/DC converter is installed within the same housing as the converter and/or the inverter.

7. The motor drive device according to claim 1, wherein the DC/DC converter restricts the output current to no more than a predetermined maximum output current value, upon performing pre-charging of the electrical storage capacitor.

8. A motor drive device that inputs AC power from a power supply to drive a motor, the motor drive device comprising:
    a converter that converts the AC power from the power supply into DC power;
    a DC/DC converter that generates DC power produced by stepping-up, stepping-down, or stepping-up and stepping-down the DC power from the converter;
    an inverter that converts the DC power from the DC/DC converter into AC power and supplies to the motor, the inverter connected to the DC/DC converter by a pair of wires; and
    an electrical storage capacitor that is provided between the DC/DC converter and the inverter, the electrical storage capacitor being the only electrical storage component connected to the pair of wires at a location between the DC/DC converter and the inverter.

9. The motor drive device according to claim 8, wherein the DC/DC converter restricts an output current to no more than a predetermined maximum output current value, or restricts a regeneration current to a predetermined maximum regeneration current value.

10. The motor drive device according to claim 8,
    wherein the DC/DC converter is a step-up/down DC/DC converter, wherein a lower limit value for the output voltage of the DC/DC converter is set based on a minimum voltage value capable of driving the motor; and wherein an upper limit value for the output voltage of the DC/DC converter is set based on a breakdown voltage of the inverter or a breakdown voltage of the motor.

11. The motor drive device according to claim 8, wherein the DC/DC converter is a step-down DC/DC converter, and wherein a lower limit value for the output voltage of the DC/DC converter is set based on a minimum voltage value capable of driving the motor.

12. The motor drive device according to claim 8, wherein the DC/DC converter is a step-up DC/DC converter, and wherein an upper limit value for the output voltage of the DC/DC converter is set based on a breakdown voltage of the inverter or a breakdown voltage of the motor.

13. The motor drive device according to claim 10, wherein a capacity value C of the electrical storage capacitor is set based on Formula (1), which is based on a maximum energy E to be supplied by the electrical storage capacitor, and an upper limit value V1 and lower limit value V2 for the output voltage of the DC/DC converter:

$$E = \tfrac{1}{2} \times C \times (V1^2 - V2^2) \tag{1}$$

14. A motor drive device that inputs AC power from a power supply to drive a motor, the motor drive device comprising:

a converter that converts the AC power from the power supply into DC power;

a DC/DC converter that generates DC power produced by stepping-up, stepping-down, or stepping-up and stepping-down the DC power from the converter;

an inverter that converts the DC power from the DC/DC converter into AC power and supplies to the motor; and an electrical storage capacitor that is provided between the DC/DC converter and the inverter, wherein the DC/DC converter is a step-up/down DC/DC converter, wherein a lower limit value for the output voltage of the DC/DC converter is set based on a minimum voltage value capable of driving the motor; and wherein an upper limit value for the output voltage of the DC/DC converter is set based on a breakdown voltage of the inverter or a breakdown voltage of the motor.

15. The motor drive device according to claim 2, wherein a capacity value C of the electrical storage capacitor is set based on Formula (1), which is based on a maximum energy E to be supplied by the electrical storage capacitor, and an upper limit value V1 and lower limit value V2 for the output voltage of the DC/DC converter:

$$E = \tfrac{1}{2} \times C \times (V1^2 - V2^2) \tag{1}$$

* * * * *